United States Patent
Ross et al.

(10) Patent No.: US 10,377,226 B1
(45) Date of Patent: Aug. 13, 2019

(54) VEHICULAR DUCT SYSTEM AND DUCT SUPPORT METHOD UTILIZING A SUPPORTIVE AND COMPLIANT SKELETON

(71) Applicant: Ford Global Technologies, LLC, Dearborn, MI (US)

(72) Inventors: Corey Ross, Detroit, MI (US); David Brian Glickman, Southfield, MI (US); Ken Osuagwu, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/889,285

(22) Filed: Feb. 6, 2018

(51) Int. Cl.
| | |
|---|---|
| *B60K 11/00* | (2006.01) |
| *B60K 11/08* | (2006.01) |
| *B60R 19/52* | (2006.01) |
| *B60R 21/34* | (2011.01) |

(52) U.S. Cl.
CPC ............ *B60K 11/08* (2013.01); *B60K 11/085* (2013.01); *B60R 19/52* (2013.01); *B60R 21/34* (2013.01); *B60R 2019/525* (2013.01); *B60R 2021/343* (2013.01)

(58) Field of Classification Search
CPC .............................. B60K 11/08; B60K 11/085
USPC ............. 296/193.1; 180/68.1, 68.3; 138/153, 138/172, 174
See application file for complete search history.

(56) References Cited

U.S. PATENT DOCUMENTS

| | | | |
|---|---|---|---|
| 4,194,556 A * | 3/1980 | Watanabe | F01P 5/06 123/41.49 |
| 5,478,127 A | 12/1995 | Chase | |
| 5,482,336 A | 1/1996 | Rouse et al. | |
| 6,701,968 B2 * | 3/2004 | Bolonhezi | F16L 11/081 138/122 |
| 7,044,517 B2 | 5/2006 | Hyuga | |
| 8,646,552 B2 | 2/2014 | Evans et al. | |
| 8,931,824 B2 | 1/2015 | Lopez et al. | |
| 9,315,168 B2 | 4/2016 | Pugh-Jones et al. | |

FOREIGN PATENT DOCUMENTS

FR          2870916     *  2/2005

* cited by examiner

*Primary Examiner* — Dennis H Pedder
(74) *Attorney, Agent, or Firm* — Carlson, Gaskey & Olds, P.C.

(57) ABSTRACT

An exemplary vehicular duct system includes, among other things, a duct wall of a first material composition, and a skeleton of a different, second material composition that is at least partially embedded within the duct wall. The skeleton is more compliant to an amount of force applied in a first direction than to the amount of force applied in a second direction that is perpendicular to the first direction. An exemplary duct support method includes, among other things, supporting a duct wall having a first material composition with a skeleton having a different, second material composition. At least a portion of the skeleton is embedded within the duct wall. The skeleton is more compliant to an amount of force applied in a first direction than a second direction perpendicular to the first direction.

18 Claims, 4 Drawing Sheets

VEHICULAR DUCT SYSTEM AND DUCT SUPPORT METHOD UTILIZING A SUPPORTIVE AND COMPLIANT SKELETON

TECHNICAL FIELD

This disclosure relates generally to a duct of a vehicle and, more particularly, to a duct incorporating a skeleton that provides support to the duct while facilitating compliance of the duct when loads are applied in certain directions.

BACKGROUND

Vehicles can incorporate various types of ducts that convey air, for example. Design requirements may necessitate that the ducts be somewhat compliant. The ducts could need to, for example, flex away from a design position in response to a load applied in a particular direction, and then return to the design position after the load is removed. The load could be a load associated with pedestrian protection, or a load resulting from the vehicle bumping into an object.

One example duct is used to convey air from outside the vehicle to an engine compartment of the vehicle. Such a duct could be used in connection with an active grille shutter system at a front of the vehicle.

SUMMARY

A vehicular duct system according to an exemplary aspect of the present disclosure includes, among other things, a duct wall of a first material composition, and a skeleton of a different, second material composition that is at least partially embedded within the duct wall. The skeleton is more compliant to an amount of force applied in a first direction than to the amount of force applied in a second direction that is perpendicular to the first direction.

In a further non-limiting embodiment of the foregoing assembly, the skeleton is more compliant to the amount of force applied in the first direction than to the amount of force applied in a third direction that is perpendicular to both the first and second directions.

In a further non-limiting embodiment of any of the foregoing assemblies, the second material composition includes more rubber than the first material composition.

In a further non-limiting embodiment of any of the foregoing assemblies, the first and second material compositions are both polymer based.

In a further non-limiting embodiment of any of the foregoing assemblies, the first material composition is a fabric.

In a further non-limiting embodiment of any of the foregoing assemblies, the duct wall is overmolded about a portion of the skeleton.

In a further non-limiting embodiment of any of the foregoing assemblies, the skeleton is a latticed structure. A portion of the duct wall extends through openings of the latticed structure.

In a further non-limiting embodiment of any of the foregoing assemblies, the duct wall provides a duct opening that conveys a flow of air to an engine compartment of a vehicle. The duct wall extends circumferentially continuously about an entire perimeter of the duct opening.

A further non-limiting embodiment of any of the foregoing assemblies includes active grille shutters. The duct opening conveys the flow of air directly to the active grille shutters.

In a further non-limiting embodiment of any of the foregoing assemblies, the first direction extends along a longitudinal axis of the vehicle and is directed toward a front of the vehicle. The second direction is directed toward a laterally facing side of the vehicle.

In a further non-limiting embodiment of any of the foregoing assemblies, the skeleton includes a plurality of V-shaped structures having arms that are compressed together in response to the amount of force.

In a further non-limiting embodiment of any of the foregoing assemblies, the arms of each of the plurality of V-shaped structures meet at an apex facing a duct opening provided by the duct wall.

In a further non-limiting embodiment of any of the foregoing assemblies, ends of the arms opposite the apex connect to a beam structure of the skeleton.

A duct support method according to an exemplary aspect of the present disclosure includes, among other things, supporting a duct wall having a first material composition with a skeleton having a different, second material composition. A portion of the skeleton is embedded within the duct wall. The skeleton is more compliant to an amount of force applied in a first direction than a second direction perpendicular to the first direction.

A further non-limiting embodiment of the foregoing method includes overmolding the duct wall about the portion of the skeleton to embed the portion within the duct wall.

In a further non-limiting embodiment of any of the foregoing methods, the skeleton is a latticed structure. At least a portion of the duct wall extends through openings of the latticed structure during the overmolding.

A further non-limiting embodiment of any of the foregoing methods includes passing a flow of air through a duct opening provided by the duct wall to an engine compartment of a vehicle. The duct wall extends circumferentially continuously about an entire perimeter of the duct opening.

A further non-limiting embodiment of any of the foregoing methods includes passing the flow of air from the duct wall directly to active grille shutters, and then to the engine compartment.

In a further non-limiting embodiment of any of the foregoing methods, the first direction extends along a longitudinal axis of the vehicle and is directed toward a front of the vehicle. The second direction is directed toward a laterally facing side of the vehicle.

A further non-limiting embodiment of any of the foregoing methods includes compressing together arms of a plurality of V-shaped structures formed in the skeleton in response to the amount of force applied in the first direction.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

A duct of a vehicle may be required to be relatively compliant to forces applied in a direction. To avoid sag, however, the same duct may be required to be relatively rigid in other directions.

This disclosure relates generally to a duct having a skeleton structure. The skeleton permits the duct to be relatively compliant when a force is applied to the duct in some directions. The skeleton supports the duct to avoid, among other things, undesirable sag in other directions. Pedestrian protection requirements can necessitate forming the duct from soft shot materials, which may be particularly prone to sag.

Figure 1:
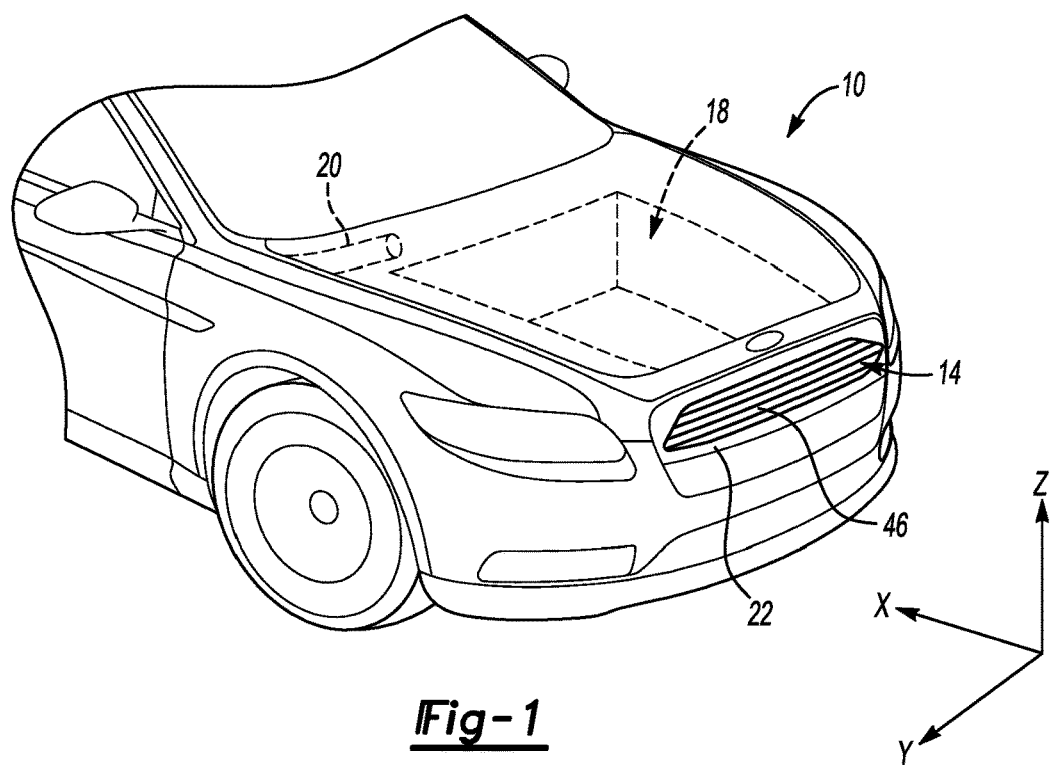
FIG. 1 illustrates a front of a vehicle that includes an exemplary embodiment of a duct system.

Referring to FIG. 1, an example vehicle 10 includes a vehicular duct system 14 utilized to convey air from outside the vehicle 10 to an engine compartment 18 of the vehicle 10. The vehicle 10 could include other duct systems, such as air tubes.

The vehicle 10 extends along a longitudinal axis X. The vehicle 10 extends laterally along an axis Y and vertically along an axis Z. The axes X, Y, and Z are perpendicular to one another.

Figure 2:
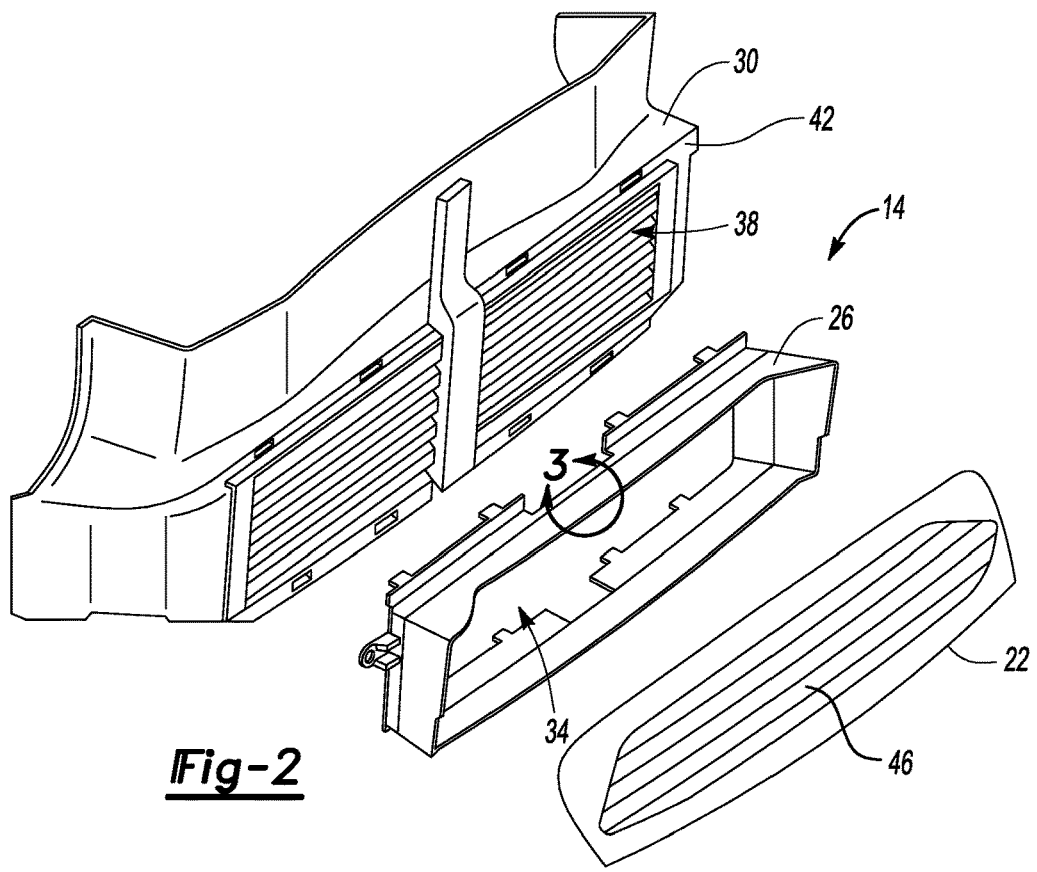
FIG. 2 illustrates an expanded view of the duct system from the vehicle of FIG. 1.

The vehicular duct system 14, with reference to the exemplary embodiment of FIG. 2, includes a fixed grille 22, a duct system 26, and an active grille assembly 30. Air moving to the engine compartment of the vehicle 10 initially passes through the fixed grille 22. The air next moves through a duct opening 34 provided by the duct system 26, and then through a plurality of active grille shutters 38 held within a housing 42 of the active grille shutter assembly 30. From the active grille assembly 30, the air moves into the engine compartment 18. The active grille shutters 38 can be rotated to control the flow of air to the engine compartment 18. An actuator, such as a motor (not shown), can be used to selectively rotate the active grille shutters 38 to control the flow of air to the engine compartment 18.

The fixed grille 22 provides a class-A surface for the vehicle 10. The fixed grille 22 includes a plurality of fixed shutters 46 in this example. In another example, the fixed shutters 46 can be omitted such that the air simply moves through an opening provided by the fixed grille 22 or through some other structure. The fixed grille 22 can be a fascia, or another type structure forward of the duct system 26 and the active grille assembly 30.

In this example, the fixed grille 22, the duct system 26, and the active grille assembly 30 are shown as separate structures. In other examples, one or more of these components could be made integral with one another, that is, the duct system 26 could extend directly from the active grille shutter assembly 30 such that the duct system 26 and the active grille shutter assembly 30 are integrated together.

Figure 3:
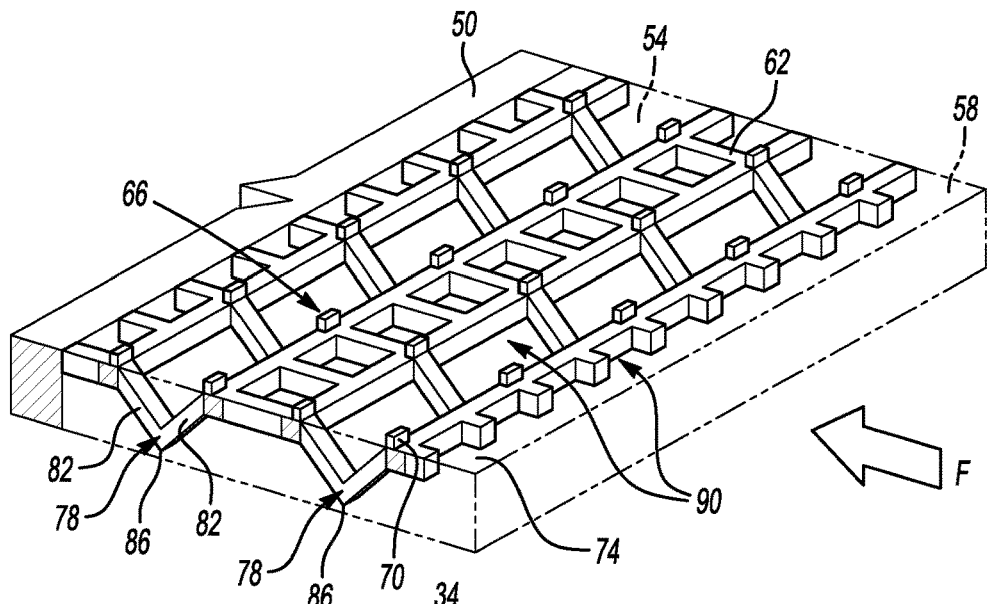
FIG. 3 illustrates a close-up view of area 3 in FIG. 2 showing a portion of a wall from a duct of the duct system.
Figure 4:
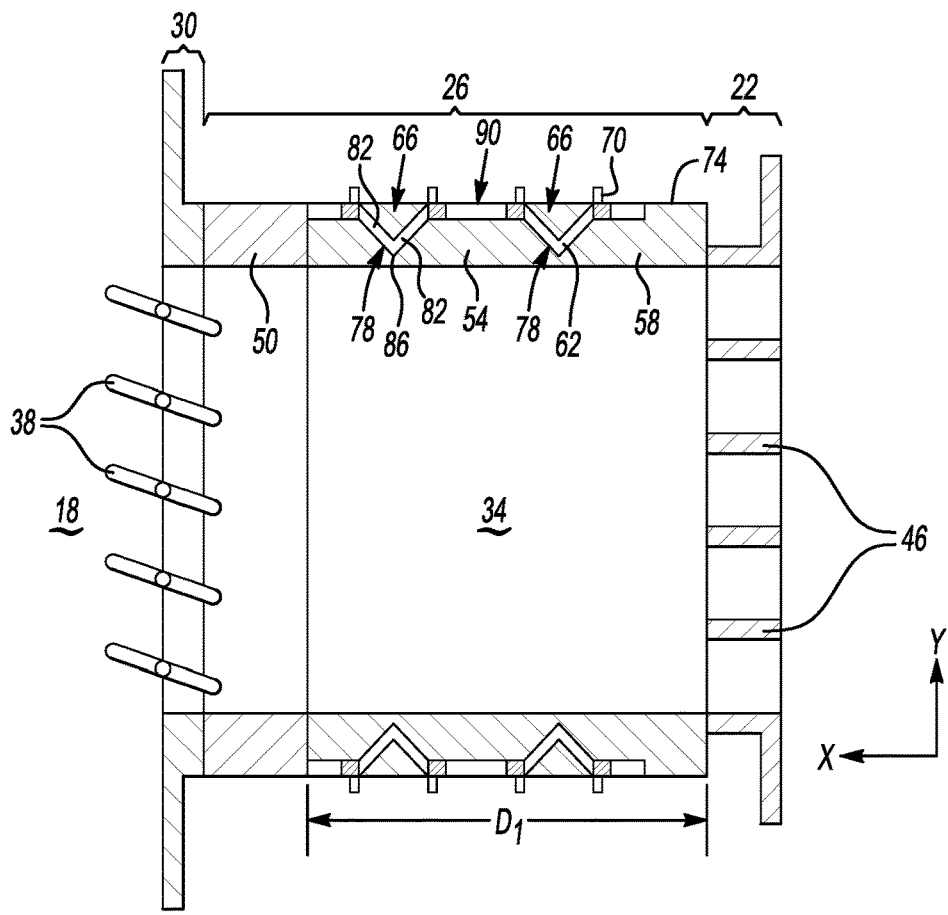
FIG. 4 illustrates a section view through the duct system of FIG. 2.
Figure 5:
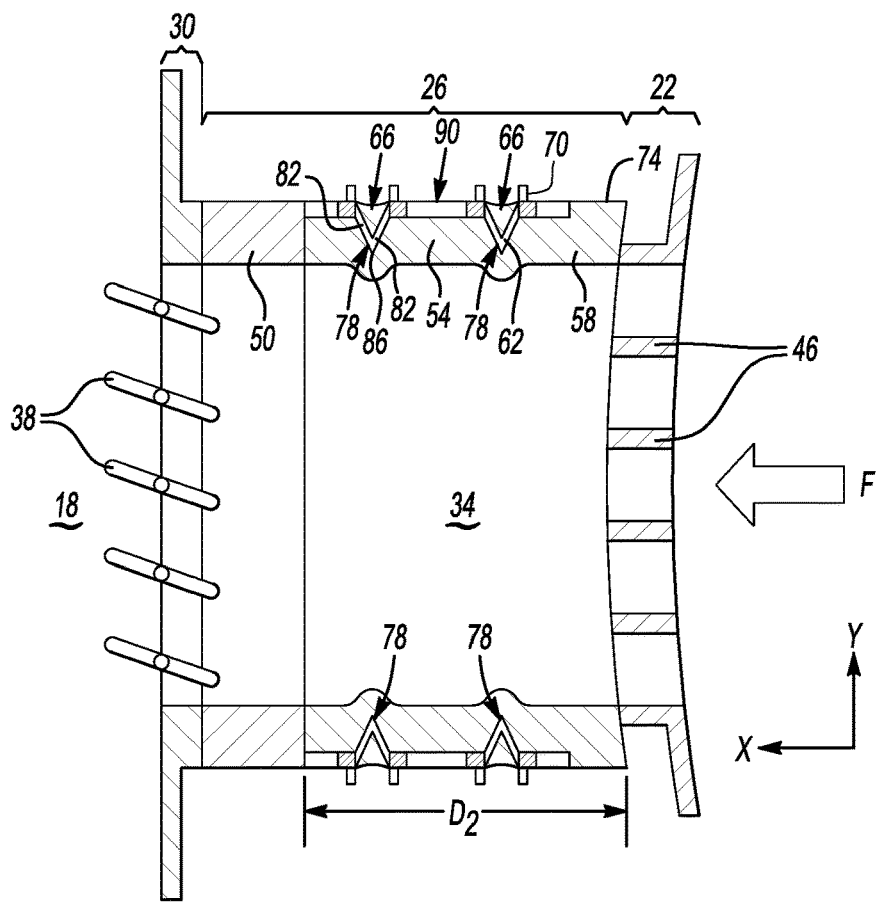
FIG. 5 illustrates the section view of FIG. 4 when a load is applied to the front of the vehicle.

With reference now to FIGS. 3-5, and continued reference to FIGS. 1 and 2, the duct system 26 includes a frame 50 and a compliant assembly 54. The frame 50 is relatively rigid when compared to the compliant assembly 54. When airflow, particularly high velocity airflow, passes through the duct system 26, the compliant assembly 54 can seal against other components to avoid leakage of air.

In this exemplary non-limiting embodiment, the compliant assembly 54 is fixed directly to the frame 50. Both the frame 50 and the compliant assembly 54 extend about an entire periphery of the duct opening 34.

The compliant assembly 54 includes a duct wall 58 and a skeleton 62. The duct wall 58 has a first material composition, and the skeleton 62 has a different, second material composition. The first material composition is a soft-shot material and compliant when compared to the second material composition, which is a hard-shot material. The soft-shot duct wall 58 can be overmolded about the hard shot skeleton 623 in some examples.

In an exemplary non-limiting embodiment, the first material composition and the second material composition are both polymer-based, but the first material composition includes more rubber than the second material composition. In another exemplary embodiment, the first material composition is a fabric, and the second material composition is polymer-based.

The skeleton 62 is a latticed structure comprising, in this example, a plurality of openings 66. The duct wall 58, when the duct wall 58 is a molded material, can be overmolded to the skeleton 62 such that portions of the duct wall 58 extend through the openings 66, and so that portions of the duct wall 58 are overmolded about the skeleton 62. Passing material of the duct wall 58 through the openings 66 can integrate together the duct wall 58 and the skeleton 62 such that the duct wall 58 and the skeleton 62 are less likely to move relative to one another when a force is applied to the compliant assembly 54.

In the exemplary embodiment, the skeleton 62 includes a plurality of tabs 70 projecting from an outer surface 74 of the duct wall 58. The tabs 70 can further integrate together movement of the duct wall 58 and the skeleton 62.

In the exemplary embodiment, the skeleton 62 also includes sections having a plurality of V-shaped structures 78. Each of the V-shaped structures 78 has a pair of arms 82 extending from an apex 86 to one of a plurality of beam portions 90 of the skeleton 62.

Notably, the V-shaped structures 78 are oriented such that when a sufficient force F is applied along the direction X from a front of the vehicle 10 the arms 82 can fold or flex and, for a given one of the V-shaped structures 78, move closer together. The tabs 70, in addition to integrating together the duct wall 58 and the skeleton 62 can help to ensure that the compliant assembly 54 folds and flexes together with the arms 82.

In FIG. 4, the compliant assembly 54 is in a design position where the compliant assembly 54 extends a distance $D_1$ from the frame 50 in the X-direction toward a front of the vehicle 10. In FIG. 5, the force F has been applied causing the compliant assembly 54 to fold and flex such that the compliant assembly extends a distance $D_2$ from the frame 50 toward the front of the vehicle 10. The distance $D_2$ is less than the distance $D_1$. The compliant assembly 54 is thus compliant to the force F. Compliance generally refers to the ability of the compliant assembly 54 to deflect in response a given load.

The duct wall 58 moves together with the skeleton 62 as the V-shaped structures 78 flex in response to the force F. When the force F is removed, the arms 82 of the V-shaped structure 78 return to a design position to return the duct wall 58 of the compliant assembly 54 to the position of FIGS. 3 and 4.

The skeleton 62 is configured such that when the same amount of force is applied to the compliant assembly 54 in a direction Z or a direction Y, the duct wall 58 will not deflect as much as when the amount of force was applied in the direction along the axis X from the front of the vehicle 10.

The skeleton 62 is more compliant to the amount of force F applied in the direction X from the front of the vehicle 10 than the same amount of force applied in another direction perpendicular to that direction. The skeleton 62 thus facilitates reducing sagging of the compliant assembly 54 from a desired design position, while still providing a structure complaint enough to withstand the force applied in the direction X from the front of the vehicle 10. The compliant assembly 54 may be required to comply a certain amount in response to the force F to, for example, meet pedestrian protection requirements.

In some examples, pedestrian protection requirements may require the compliant assembly 54 to deflect more than a threshold value in response to a leg form applying a force to the fixed grille 22. The force applied to the fixed grille 22 by the leg form could be up to 300 pounds in some examples.

Although described in connection with a force F applied in the direction X from in front of the vehicle 10, other examples could include skeletons designed to facilitate compliance of duct walls in other directions. For example, if the duct is the air tube 20, the skeleton may need to facilitate compliance in the direction Y when a force is applied from above the air tube 20, while remaining relatively rigid in the X and Z directions.

The directionally varied compliance is due to, in the exemplary embodiment, the V-shaped structures 78. Other structures could be incorporated into the skeleton 62 to provide directionally varied compliance in other examples.

In this disclosure, like reference numerals designate like elements where appropriate, and reference numerals with the addition of one-hundred or multiples thereof designate modified elements. The modified elements incorporate the same features and benefits of the corresponding modified elements, expect where stated otherwise.

Figure 6:
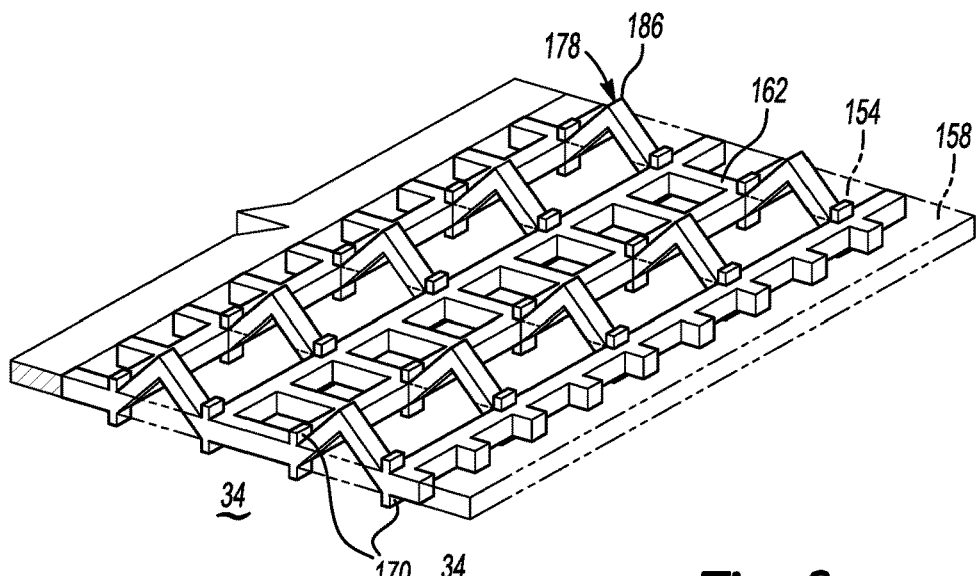
FIG. 6 illustrates a close-up view of a portion of a wall from a duct according to another exemplary embodiment.

Referring now to FIG. 6, another exemplary compliant assembly 154 includes a skeleton 162 at least partially embedded within a duct wall 158. The skeleton 162 includes V-shaped structures 178 each having an apex 186 pointing away from the duct opening 34. The skeleton 162 includes a plurality of tabs 170 to integrate together the skeleton 162 with the duct wall 158. The skeleton 162 ensures that the compliant assembly 154 is compliant to a force applied along a longitudinal axis of a vehicle while still providing support to combat sagging.

Figure 7:
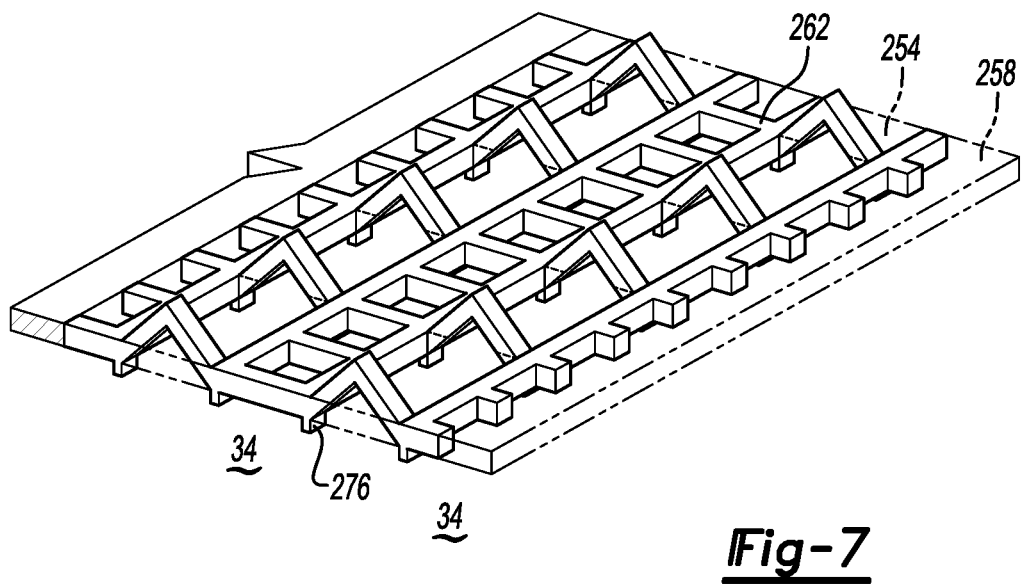
FIG. 7 illustrates a close-up view of a portion of a wall from a duct according to yet another exemplary embodiment.

Referring now to FIG. 7, yet another exemplary compliant assembly 254 includes a skeleton 262 at least partially embedded within a duct wall 258. The skeleton 262, in contrast to the skeleton 162 of FIG. 6, includes tabs 270 on a side of the skeleton 262 facing the duct opening 34. The skeleton 262 includes a plurality of tabs 270 to integrate together the skeleton 262 with the duct wall 258. The skeleton 262 ensures that the compliant assembly 254 is compliant to a force applied along a longitudinal axis of a vehicle while still providing support to combat sagging.

Figure 8:
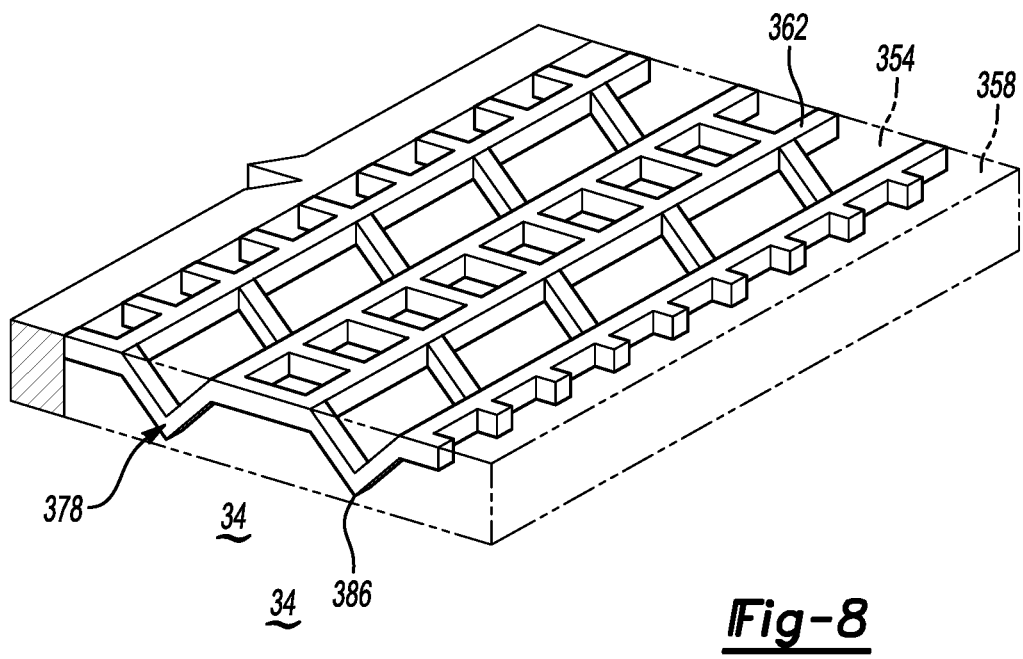
FIG. 8 illustrates a close-up view of a portion of a wall from a duct according to still another exemplary embodiment.

Referring now to FIG. 8, yet another exemplary compliant assembly 354 includes a skeleton 362 that is substantially wholly embedded within a duct wall 358. The skeleton 368 includes no tabs extending away from the duct opening 34 or toward the duct opening 34. V-shaped structures 378 of the skeleton 362 includes respective apexes 386 facing toward the duct opening 34. The skeleton 362 ensures that the compliant assembly 354 is compliant to a force applied along a longitudinal axis of a vehicle while still providing support to combat sagging.

Features of the disclosed examples include a duct system incorporating a skeleton that supports a duct wall of the duct system while facilitating compliance of the duct wall in certain directions. Although described in connection with a duct wall of a duct that communicates air to an active grille assembly, the teachings of this disclosure could be used in combination with other vehicular duct assemblies such as for example, dirty air tubes.

In some examples, substantially the same injection molding equipment can be used to mold the compliant assembly with the skeleton, as well as a compliant assembly without the skeleton. Thus, substantial tooling changes may not be required. Since the skeleton can be integral with other portions of the duct wall, additional packaging space to accommodate the skeleton may not be required.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicular duct system, comprising:
   a duct wall of a first material composition, the duct wall about a perimeter of a duct opening that conveys a flow of air to an engine compartment of a vehicle; and
   a skeleton of a different, second material composition that is at least partially embedded within the duct wall, the skeleton more compliant to an amount of force applied in a first direction than a second direction perpendicular to the first direction, the first direction extends along a longitudinal axis of the vehicle and is directed toward a front of the vehicle, wherein the second direction is directed toward a laterally facing side of the vehicle.

2. The assembly of claim 1, wherein the skeleton is more compliant to the amount of force applied in the first direction than a third direction that is perpendicular to both the first and second directions.

3. The assembly of claim 1, wherein the first material composition includes more rubber than the second material composition.

4. The assembly of claim 1, wherein the first and second material compositions are both polymer based.

5. The assembly of claim 1, wherein the first material composition is a fabric.

6. The assembly of claim 1, wherein the duct wall is overmolded about at least a portion of the skeleton.

7. The assembly of claim 1, wherein the skeleton is a latticed structure, at least a portion of the duct wall extends through openings of the latticed structure.

8. The assembly of claim 1, wherein the duct wall extends circumferentially continuously about an entire perimeter of the duct opening.

9. The assembly of claim 8, further comprising a plurality of active grille shutters, the duct opening conveying the flow of air directly to the plurality of active grille shutters.

10. A vehicular duct system, comprising:
a duct wall of a first material composition; and
a skeleton of a different, second material composition that is at least partially embedded within the duct wall, the skeleton more compliant to an amount of force applied in a first direction than a second direction perpendicular to the first direction, wherein the skeleton includes a plurality of V-shaped structures having arms that are compressed together in response to the amount of force.

11. The assembly of claim 10, wherein the arms of each of the plurality of V-shaped structures meet at an apex facing a duct opening provided by the duct wall.

12. The assembly of claim 11, wherein ends of the arms opposite the apex connect to a beam structure of the skeleton.

13. A duct support method, comprising:
supporting a duct wall having a first material composition with a skeleton having a different, second material composition, at least a portion of the skeleton embedded within the duct wall, the skeleton more compliant to an amount of force applied in a first direction than a second direction perpendicular to the first direction; and
compressing together arms of a plurality of V-shaped structures formed in the skeleton in response to the amount of force applied in the first direction.

14. The method of claim 13, further comprising overmolding the duct wall about the portion of the skeleton to embed the portion within the duct wall.

15. The method of claim 14, wherein the skeleton is a latticed structure, and at least a portion of the duct wall extends through openings of the latticed structure during the overmolding.

16. The method of claim 13, further comprising passing a flow of air through a duct opening provided by the duct wall to an engine compartment of a vehicle, the duct wall extending circumferentially continuously about an entire perimeter of the duct opening.

17. The method of claim 16, passing the flow of air from the duct wall directly to a plurality of active grille shutters, and then to the engine compartment.

18. The method of claim 16, wherein the first direction extends along a longitudinal axis of the vehicle and is directed toward a front of the vehicle, wherein the second direction is directed toward a laterally facing side of the vehicle.

* * * * *